E. A. FISH.
INDICATOR AND REGISTER FOR MARINE VESSELS.
APPLICATION FILED JAN. 7, 1911.

1,008,457.

Patented Nov. 14, 1911.

2 SHEETS—SHEET 1.

*Edwin A. Fish,*
INVENTOR

WITNESSES:

BY
ATTORNEY.

E. A. FISH.
INDICATOR AND REGISTER FOR MARINE VESSELS.
APPLICATION FILED JAN. 7, 1911.
1,008,457.
Patented Nov. 14, 1911.
2 SHEETS—SHEET 2.
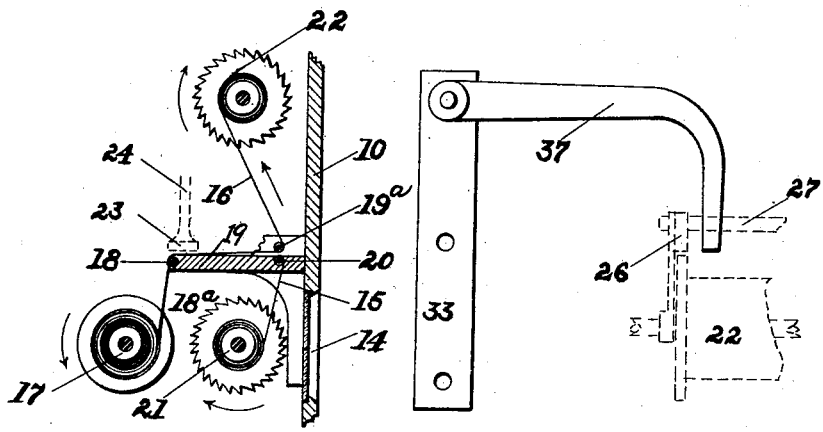
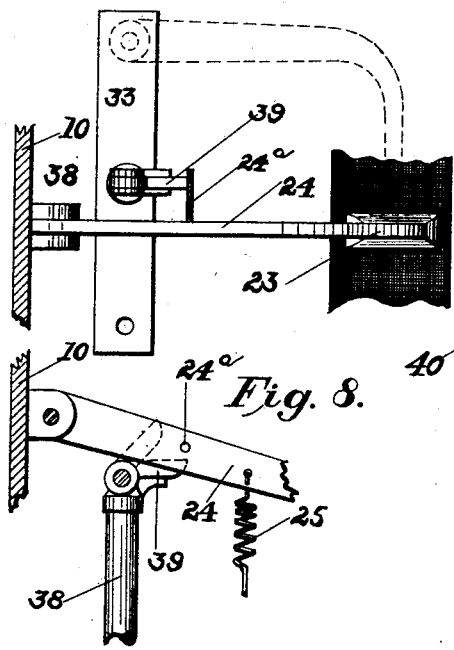
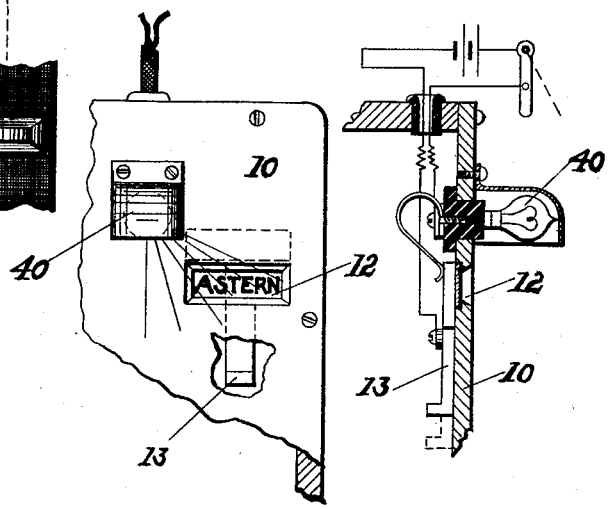
WITNESSES:
EDWIN A. FISH,
INVENTOR
ATTORNEY.
COLUMBIA PLANOGRAPH CO., WASHINGTON, D. C.

UNITED STATES PATENT OFFICE.

EDWIN A. FISH, OF NEW LONDON, CONNECTICUT.

INDICATOR AND REGISTER FOR MARINE VESSELS.

1,008,457. Specification of Letters Patent. Patented Nov. 14, 1911.

Application filed January 7, 1911. Serial No. 601,359.

*To all whom it may concern:*

Be it known that I, EDWIN A. FISH, a citizen of the United States, residing at New London, in the county of New London and State of Connecticut, have invented certain new and useful Improvements in Indicators and Registers for Marine Vessels, of which the following is a specification.

The object of this invention is to provide simple but accurate means for indicating visibly, at any desired part of a vessel, the direction of rotation of the engine, thus showing, in the pilot house, for example, whether signals to "go ahead" or "back," as the case may be, have been understood and obeyed by the engineer. My improvement also includes means for automatically recording the movements of the said indicator.

Briefly described, my invention consists of pressure, or vacuum, operated plungers, located in a suitable housing that is provided with slitted openings, and means, operable by the movement of said plungers, for moving into register with one of said openings the word "ahead" and into register with the companion opening the word "astern;" or other words that will denote the direction in which the vessel is being impelled by the engine. Mechanism, also operable by said plungers, is provided for printing upon a ribbon a permanent record of each and every movement of said plungers. The plungers may be actuated by steam, or air, pressure, or by vacuum, it being only necessary that the same shall be controlled by the forward or backward rotation of the engine shaft, or some other reversible part of the mechanism connected with, or at least controlled by, said engine, in such manner that the forward rotation of the engine will actuate the "ahead" indicating mechanism, and the backward rotation of the engine will operate to actuate the "astern" indicating mechanism.

In order to explain my said invention clearly I have provided the accompanying sheets of drawings, in which—

Figure 1:
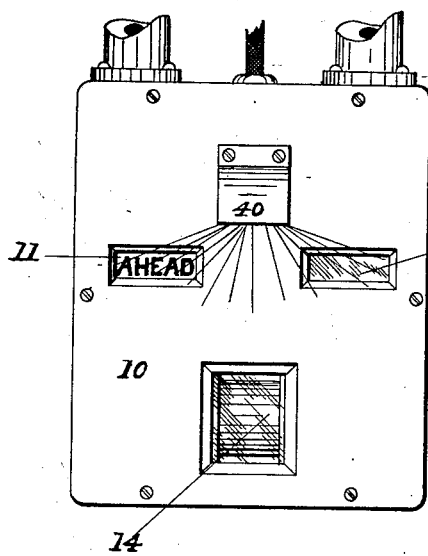
Figure 2:
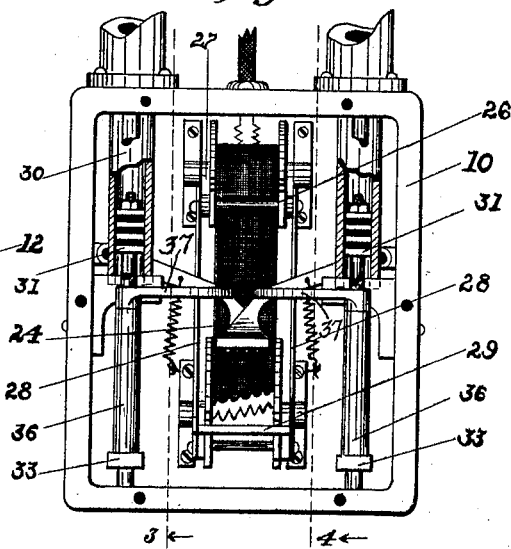
Figure 3:
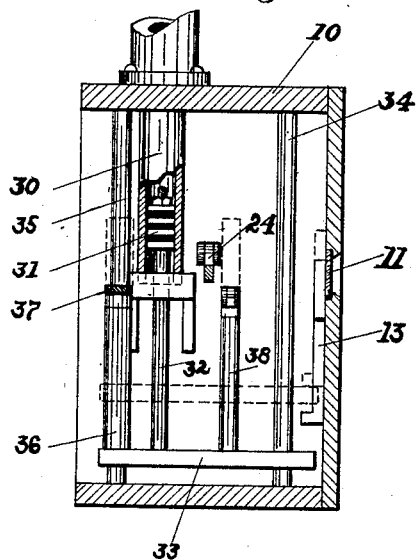
Figure 4:
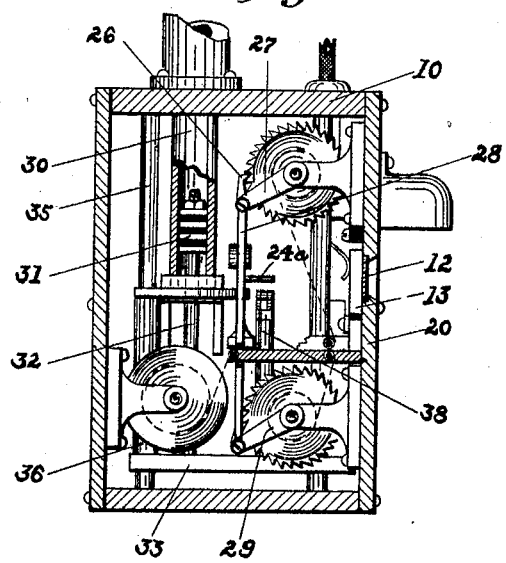

Figure 1 is a front elevation of an indicator embodying my present improvements, and Fig. 2 is a rear side elevation of the same with the back plate removed. Fig. 3 is a vertical, transverse, sectional view of said indicator taken on line 3—3 of Fig. 1, looking in the direction of the arrow, and Fig. 4 is a similar view taken on line 4—4 of said Fig. 1. Fig. 5 is a detached, diagrammatic view of the recording devices. Fig. 6 is a plan view of an arm 37 by means of which said recording devices are actuated at the proper time. Figs. 7 and 8 are, respectively, top and side views of the printing lever 24 and of a vertically movable trip by means of which said lever is raised. In Fig. 9 I have shown, in front elevation, and also in section, a portion of the housing having mounted thereon an electric light for illuminating the indicator openings.

My invention includes a novel arrangement of coöperating visible indicator mechanism and printing mechanism, located within a suitable housing which is here illustrated as rectangular and is denoted by the reference numeral 10. The front of said housing is provided with openings 11—12. Immediately at the rear of one of said openings is a vertically movable slide 13 upon which is printed the word "ahead," which may be viewed through said opening when the slide is in its elevated position and at the rear of the opening 12 is a similar slide upon which the word "astern" is printed. The front of the housing 10 is also provided with an opening 14 through which may be viewed a tape 15 upon which is permanently recorded the successive operations of the indicator mechanism, as I will describe in detail later.

In Fig. 5 of the accompanying drawings I have shown the tape 15 and also the relative arrangement of the rolls upon which said tape is mounted, as well as a novel arrangement of inking ribbon, which latter is indicated by the numeral 16. The tape 15 and ribbon 16 are wound together on a spool 17 and pass thence upward, together, over an idle roll 18 and along a fixed platen 19 to certain idle rolls 19ª—20 where they separate; the tape passing over roll 20 and downward to a take-up spool 21 while the inking ribbon 16 passes around roll 19 and upward to a take-up spool 22. The printing is effected by a form 23 at the free end of an arm 24 that is hinged to the inside of the housing 10, as will perhaps be best understood by reference to Figs. 2, 7 and 8 of the drawings; the arm 24 being held normally in its lower-most position by a spring 25. The take-up spool 22 is actuated by pawl and ratchet mechanism, the pawl (26) being mounted in a frame 27 that is loosely mounted on the axial support of the said spool, said frame 27 being connected by rods 28 with similar pawl and ratchet mechanism carried by a frame 29 which is loosely hung on the axial support of the lower take-up roll 21. When the frame 27 is raised the described pawl and ratchet mechanisms operate to partially rotate the spools 22 and 21 simultaneously thus drawing forward and separating the inking ribbon and the tape 15 and causing the printed face of said tape to move into register with the opening 14. By preference I provide a suitable friction drag in connection with the delivery spool 17 to prevent the tape and ribbon from running off from said spool too freely.

By reference to Fig. 2 it will be understood that independently operable mechanisms are provided for controlling the indicator slides 13 but that the recording devices are actuated by the movement of either of said mechanisms; that is to say, the ribbon and tape are fed forward whenever either the "ahead" or "astern" indicator mechanism is operated.

In my improved device, as here illustrated, the prime mover consists of a cylinder 30 in which is a packed plunger or piston 31 whose stem 32 extends downwardly and is secured to a cross-bar 33 whose opposite end portions are adapted to slide vertically on guide-rods 34—35. Also mounted to slide on the rod 35 is a tube or sleeve 36 whose lower end is fixedly secured to the cross-bar 33 in such manner that the said tube will move upward and downward with the valve-stem and cross-bar 33. Extending laterally from the upper end portion of tube 36 is an arm 37 whose free end is curved toward the front of the housing and lies immediately below the frame 27 (see Fig. 6) and so that, when the arm 37 moves upward, it will engage, and lift, the said frame sufficiently to actuate the pawl and ratchet mechanism and thus feed the inking ribbon and tape forward in the manner already explained. The cross-bar 33 also has secured thereto an upwardly extending post 38 in whose free end is hinged a dog 39 adapted to engage a stud 24$^a$ at the side of the lever arm 24, when the post 38 is moved upward by the cross-bar 33, thus raising the arm 24 until the dog passes out of engagement with the said stud, when the spring 25 snaps the said arm forcibly back to its normal position and causes the form 23 to strike a sharp blow upon the inking ribbon 16 and thus stamp an imprint of said form upon the tape. When the post 38 is being lowered to its normal position the dog 39 engages the upper side of stud 24$^a$ and then swings on its hinge pintle until its free end drops below the stud (see Fig. 8).

The operation of my indicator and register is as follows—Assuming that the cylinders 30 are so connected with the engine or engine-shaft that a vacuum is induced in one of said cylinders by the forward rotation of said shaft, and in the other of said cylinders upon the backward rotation of said shaft; the upward movement of the piston 31 and its rod 32 will lift the cross-bar 33 and the attached tube 36 and post 38. The dog 39 will first lift the printing lever 24 and the form 23 will be imprinted upon the tape 15. Continued upward movement of the cross-bar will move the free end of the arm 37 into engagement with the frame 27 and the inking ribbon and tape will be moved forward. Simultaneously, the end of the cross-bar will engage the slide 13 and move it upward until the word "ahead" is exposed in the opening 11. So soon as the engine shaft is reversed, and the vacuum is broken, the piston and connected parts, which I have just described, drop to their normal, or inoperative, positions and the vacuum induced in the opposite cylinder starts into action its piston and connected parts and thus records and indicates that the vessel is going "astern."

In order to render my described apparatus still more effective I prefer to provide at some suitable place as, for example, upon the front of the housing 10, an electric light 40 which will not only serve to attract the attention of the pilot, whenever the indicator mechanism is started into action, but will also serve to illuminate the openings 11—12. The particular manner of closing the circuit to light the electric lamp is not material. As here shown, however, this is accomplished by the upward movement of the slide 13, as will be understood by reference to Fig. 9 of the drawings.

By means of my described apparatus the pilot is enabled to see at a glance, and with positive assurance, that his signals have been received, understood, and carried into effect by the engineer and, in the event of a controversy, or misunderstanding, the record imprinted upon the tape 15 may be referred to.

Having thus described my invention I claim as new and wish to secure by Letters Patent:—

1. In an indicator and recorder for marine vessels, a piston-cylinder, a piston reciprocable therein and controllable by an engine-shaft, a visual-indicator controllable by the movement of said piston, and a recorder, comprehending: a tape, a superposed inking ribbon, means for feeding the tape and ribbon with a step-by-step movement, and means, operable by said piston, for printing upon the said tape.

2. In an indicator and recorder for marine vessels, a piston-cylinder, a piston reciprocable therein and controllable by an engine-shaft, a slide, bearing a sign, controllable by the movement of said piston, and a recorder, comprehending: a tape, a superposed inking ribbon, means for feeding the tape and ribbon with a step-by-step movement, and means, operable by said piston, for printing upon the said tape.

3. In an indicator and recorder for marine vessels, a piston-cylinder, a piston reciprocable therein and controllable by an engine-shaft, a piston-stem, a member carried thereby, a slide, bearing a sign, disposed in the path of movement of said member, to be engaged and moved thereby, and a recorder, comprehending: a tape, a superposed inking-ribbon, means for feeding the tape and ribbon with a step-by-step movement, and means, operable by said stem-carried member, for printing upon said tape.

4. In an indicator and recorder for marine vessels, a piston-cylinder, a piston reciprocable therein and controllable by an engine-shaft, a piston-stem, a member carried thereby, a slide, bearing a sign, disposed in the path of movement of said member, to be engaged and moved thereby, and a recorder, comprehending: a tape, a superposed inking-ribbon, means for feeding the tape and ribbon with a step-by-step movement, a pivoted printing-member engageable with said tape and inking-ribbon, and mechanism, carried by said stem-carried member, for actuating said printing-member upon movement of said stem-carried member.

5. In an indicator and recorder for marine vessels, a piston-cylinder, a piston reciprocable therein and controllable by an engine-shaft, a piston-stem, a member carried thereby, a slide, bearing a sign, disposed in the path of movement of said member, to be engaged and moved thereby, and a recorder, comprehending: a tape, a superposed inking-ribbon, means for feeding the tape and ribbon with a step-by-step movement, a pivoted printing-member engageable with said tape and inking-ribbon, and a post, carried by said stem-carried member, having a pivoted dog operatively engageable with said printing-member to actuate the same upon movement of said post.

6. In an indicator and recorder for marine vessels, a piston-cylinder, a piston reciprocable therein, and controllable by an engine-shaft, a piston-stem, a member carried thereby, a slide, bearing a sign, disposed in the path of movement of said member, to be engaged and moved thereby, and a recorder, comprehending: a tape, a superposed inking-ribbon, spools on which said inking-ribbon and tape are wound, ratchet-wheels operatively associated with said spools, and means, controllable by the movement of said stem-carried member, for rotating said ratchet-wheels step-by-step.

7. In an indicator and recorder for marine vessels, a piston-cylinder, a piston reciprocable therein and controllable by an engine-shaft, a piston-stem, a member carried thereby, a slide, bearing a sign, disposed in the path of movement of said member, and a recorder, comprehending: a tape, a superposed inking-ribbon, spools on which said tape and inking-ribbon are separately wound, ratchet-wheels operatively associated with said spools, pawls engaging said ratchet-wheels, means uniting said pawls and moving the latter in unison, and means, controllable by the movement of said stem-carried member, for moving said pawl-uniting means.

8. In an indicator and recorder for marine vessels, a piston-cylinder, a piston reciprocable therein and controllable by an engine-shaft, a piston-stem, a cross-bar carried thereby, a slide, bearing a sign, disposed in the path of movement of said member, and a recorder, comprehending: a tape, a superposed inking-ribbon, spools on which said tape and inking-ribbon are separately wound, ratchet-wheels operatively associated with said spools, pawls engaging said ratchet-wheels, means uniting said pawls and moving the latter in unison, and means, carried by said cross-bar and engageable with said pawl-uniting means, for moving the latter.

EDWIN A. FISH.

Witnesses:
MADELINE D. RITCHIE,
FRANK H. ALLEN.

Copies of this patent may be obtained for five cents each, by addressing the "Commissioner of Patents, Washington, D. C."